United States Patent
Zheng et al.

(10) Patent No.: US 6,721,143 B2
(45) Date of Patent: Apr. 13, 2004

(54) FERROMAGNETIC/ANTIFERROMAGNETIC BILAYER, INCLUDING DECOUPLER, FOR LONGITUDINAL BIAS

(75) Inventors: You Feng Zheng, San Jose, CA (US); Kochan Ju, Fremont, CA (US); Cheng T. Horng, San Jose, CA (US); Simon Liao, Fremont, CA (US); Ru Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 294 days.

(21) Appl. No.: 09/933,963

(22) Filed: Aug. 22, 2001

(65) Prior Publication Data

US 2003/0039079 A1 Feb. 27, 2003

(51) Int. Cl.[7] .................................................. G11B 5/39
(52) U.S. Cl. ............................... 360/324.1; 29/603.15; 29/603.18; 216/22
(58) Field of Search ........................ 360/324.1, 324.11, 360/324.12; 29/603.07, 603.13, 603.14, 603.15, 603.16, 603.18; 216/22, 66

(56) References Cited

U.S. PATENT DOCUMENTS

| | | | |
|---|---|---|---|
| 5,528,440 A | 6/1996 | Fontana et al. | 360/324.12 |
| 5,664,316 A | 9/1997 | Chen et al. | 29/603.08 |
| 5,705,973 A | 1/1998 | Yuan et al. | 338/32 R |
| 5,856,897 A | 1/1999 | Mauri | 360/314 |
| 6,074,767 A * | 6/2000 | Lin | 428/692 |
| 6,118,624 A * | 9/2000 | Fukuzawa et al. | 360/324.12 |
| 6,157,526 A * | 12/2000 | Watanabe et al. | 360/324.12 |
| 6,185,078 B1 | 2/2001 | Lin et al. | 360/324.12 |
| 6,668,443 B2 * | 12/2003 | Chien et al. | 29/603.18 |

* cited by examiner

*Primary Examiner*—David L. Ometz
(74) *Attorney, Agent, or Firm*—George O. Saile; Stephen B. Ackerman

(57) ABSTRACT

As the dimensions of spin valve heads continue to be reduced, a number of difficulties are being encountered. One such is with the longitudinal bias when an external magnetic field can cause reversal of the hard magnet, thereby causing a hysteric response by the head. This coercivity reduction becomes more severe as the hard magnet becomes thinner. This problem has been overcome by inserting a decoupling layer between the antiferromagnetic layer that is used to stabilize the pinned layer of the spin valve itself and the soft ferromagnetic layer that is used for longitudinal biasing. This soft ferromagnetic layer is pinned by a second antiferromagnetic layer deposited on it on its far side away from the first antiferromagnetic layer. The presence of the decoupling layer ensures that the magnetization of the soft layer is determined only by the second antiferromagnetic layer. The inclusion of the decoupling layer allows more latitude in etch depth control during manufacturing.

12 Claims, 3 Drawing Sheets

FERROMAGNETIC/ANTIFERROMAGNETIC BILAYER, INCLUDING DECOUPLER, FOR LONGITUDINAL BIAS

FIELD OF THE INVENTION

The invention relates to the general field of magnetic disks with particular reference to GMR read heads and use of longitudinal bias leads therewith.

BACKGROUND OF THE INVENTION

The present invention is concerned with the manufacture of the read element in a magnetic disk system. This is a thin slice of material, located between two magnetic shields, whose electrical resistivity changes on exposure to a magnetic field. Magneto-resistance can be significantly increased by means of a structure known as a spin valve (SV). The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are two magnetic layers separated by a non-magnetic layer. The thickness of the non-magnetic layer is chosen so that the magnetic layers are sufficiently far apart for exchange effects to be negligible but are close enough to be within the mean free path of conduction electrons in the material. If the two magnetic layers are magnetized in opposite directions and a current is passed through them along the direction of magnetization, half the electrons in each layer will be subject to increased scattering while half will be unaffected (to a first approximation). Furthermore, only the unaffected electrons will have mean free paths long enough for them to have a high probability of crossing the non magnetic layer. Once these electrons have crossed the non-magnetic layer, they are immediately subject to increased scattering, thereby becoming unlikely to return to their original side, the overall result being a significant increase in the resistance of the entire structure.

In order to make use of the GMR effect, the direction of magnetization of one of the layers must be permanently fixed, or pinned. Pinning is achieved by first magnetizing the layer (by depositing and/or annealing it in the presence of a magnetic field) and then permanently maintaining the magnetization by over coating with a layer of antiferromagnetic (AFM) material. The other layer, by contrast, is a "free layer" whose direction of magnetization can be readily changed by an external field (such as that associated with a bit at the surface of a magnetic disk). Structures in which the pinned layer is at the top are referred to as top spin valves. Similarly, in a bottom spin valve structure the pinned layer is at the bottom.

Although not directly connected to the GMR effect, an important feature of spin valve structures is a pair of longitudinal bias stripes that are permanently magnetized in a direction parallel to the long dimension of the device. Their purpose is to prevent the formation of multiple magnetic domains in the free layer portion of the GMR sensor, particularly near its ends. Thus longitudinal bias is responsible for the stability of a spin-valve recording head. It is usually achieved by an abutted-type junction formed during hard bias and lead deposition. Longitudinal bias layers may be implemented as permanent magnets by using a hard magnetic material or they may be compounded of a magnetically soft material whose magnetization is maintained by means of a contiguous antiferromagnetic layer.

As the dimensions of spin valve heads continue to be reduced, a number of difficulties in the associated fabrication processes are being encountered. When permanent magnets are used to supply contiguous junction stabilization, the junction region is always a major source of noise and instability due to the uncertain shape and coercivity reduction of the hard bias film at the junction area. It is known that the longitudinal bias permanent magnet is not as hard at the junction region as it is in the bulk material because of its long tapered tail. An external magnetic field can cause irreversible reversal of the hard magnet, thereby causing a hysteric response by the head. This coercivity reduction becomes more severe as the hard magnet becomes thinner.

In U.S. Pat. No. 5,664,316 it was shown that a ferromagnetic/antiferromagnetic coupled layer could be used to replace a permanent magnet. It was also claimed that when a ferromagnetic/antiferromagnetic coupled layer is used, magnetic instability in the junction area will be reduced. In U.S. Pat. No. 5,528,440 it was proposed to apply this structure to provide longitudinal bias in a spin valve head.

In both of the above-cited patents, the ferromagnetic/antiferromagnetic bi-layer was deposited directly after the removal of the side region of the sensor stack. This approach requires very precise control of the end point of the etching process. As an example, consider a bottom spin valve structure in which the GMR stack is ordered from top to bottom as: free/non-magnetic/AP1/Ru/AP2/AFM, where AP1 and AP2 are two ferromagnetic layers magnetized to be anti-parallel to one another, AP2 being the layer closest to the AFM.

When such a structure is being made, etching (to form the GMR pedestal) cannot be allowed to proceed beyond the nonmagnetic layer. Etching down to AP1, AP2, or the AFM layer will result in head instability due to the transverse exchange coupling field from the AP or the AFM layer. As sensor thickness is reduced even further, this scheme becomes more and more difficult to control due to the criticality of the end point.

Another approach to avoiding the above-discussed problem has been to over etch so all GMR stack layers get removed along the pedestal's sides. However, this method introduces a new problem viz. an increase in the incidence of shorts between the sensor to the bottom shield since some of the lower dielectric layer must also get removed.

A routine search of the prior art was performed with the following references of interest being found:

In U.S. Pat. No. 6,185,078, Lin et al. disclose using a layer of nickel oxide as a pinning layer for a NiFe bias layer. Since the NiO is an insulator, any insulation lost as a result of removing too much of the lower dielectric gets replaced. A glue layer of Ta is used under the lead layer. U.S. Pat. No. 5,664,316 (Chen et al.), U.S. Pat. No. 5,705,973 (Yuan et al.) are all related patents. U.S. Pat. No. 5,856,897 (Mauri) shows a stabilization layer under the lead layer.

SUMMARY OF THE INVENTION

It has been an object of the present invention to provide a bottom spin valve structure with longitudinal bias of improved stability.

Another object has been to provide a process for manufacturing said structure.

A further object has been that said process allow substantial latitude for end point control during the etching of the GMR pedestal.

These objects have been achieved by inserting a decoupling layer between the antiferromagnetic layer that is used to stabilize the pinned layer of the spin valve itself and the soft ferromagnetic layer that is used for longitudinal biasing. This soft ferromagnetic layer is pinned by a second antiferromagnetic layer deposited on it on its far side away from the first antiferromagnetic layer. The presence of the decoupling layer ensures that the magnetization of the soft layer is determined only by the second antiferromagnetic layer.

DESCRIPTION OF THE PREFERRED EMBODIMENTS

In the present invention, the ferromagnetic antiferromagnetic coupled layer discussed above has been used to provide the longitudinal bias field. In a key departure from the prior art, a decoupling layer has been inserted between the antiferromagnetic layer that is used to stabilize the pinned layer of the spin valve itself and the soft ferromagnetic layer that is used for longitudinal biasing. This soft ferromagnetic layer is pinned by a second antiferromagnetic layer deposited on it on its far side away from the first antiferromagnetic layer. The presence of the decoupling layer ensures that the magnetization of the soft layer is determined only by the second antiferromagnetic layer.

Our preferred material for the de-coupling layer has been tantalum, but other similar materials such as tantalum oxide or tantalum nitride that have the requisite properties, namely being non-magnetic, could also have been used. Our preferred thickness for the decoupling layer has been about 30 Angstroms, but any thickness in a range of from about 20–50 Angstroms could have been used.

When this decoupling layer is in place the end point for etching when forming the GMR pedestal is not critical anymore. The etch process is no longer required to stop just before the nonmagnetic layer or to continue all the way through the entire GMR stack in order to avoid exchange coupling with the AFM layer. This gives much better process tolerance as well as avoiding the formation of shorts to the underlaying magnetic shield.

An additional advantage is greater flexibility in the choice what soft ferromagnetic material to use for the bias leads since this material is no longer required to be identical to the free layer. By choosing a high moment material, the thickness of the side region can be reduced, thereby improving the topography of the sensor stack.

The conductor lead can be deposited in the same sequence steps as the SFM/AFM bi-layer, or alternatively, in subsequence steps to obtain a lead-overlaid structure.

We now describe a process for manufacturing the read head of the present invention. In the course of this description the structure of the present invention will also become apparent.

Figure 1:
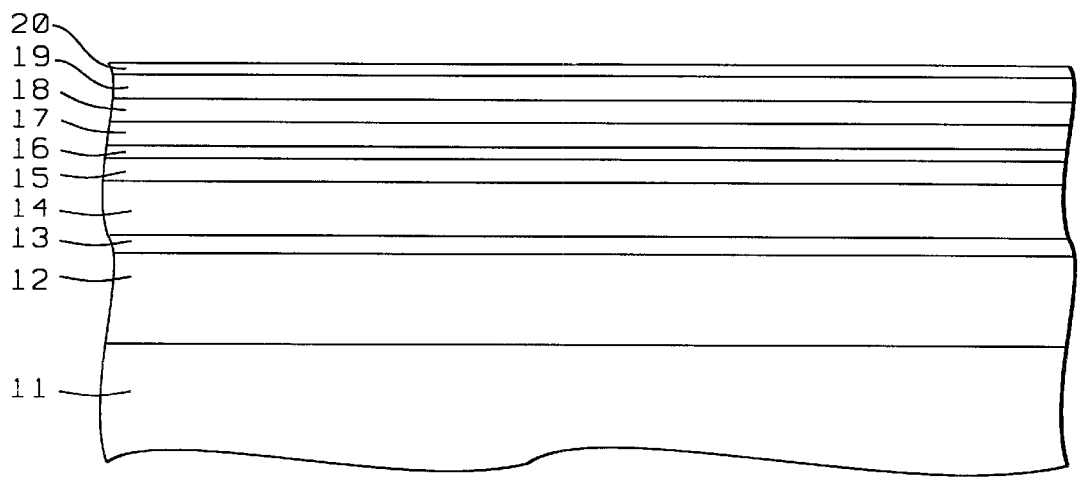
FIG. 1 illustrated the layers laid down to form a GMR stack.

Referring now to FIG. 1, the process begins with the provision of dielectric layer 12 (between about 100 and 300 Angstroms thick) which rests on a magnetic shield layer 11. Antiferromagnetic layer 14 is then deposited onto a GMR-enhancing seed layer 13, such as NiCr or NiFreCr, which has been deposited onto dielectric layer 12. Our preferred material for antiferromagnetic layer 14 has been MnPt, but any similar material such as MnNi, MnPdPt, or IrMn could also have been used. The thickness of layer 14 was between about 75 and 200 Angstroms, with about 150 Angstroms being preferred.

This is followed by the deposition of the pinned layer for the GMR stack. This pinned layer is actually a laminate of three layers: layers 15 and 17 which are separated by ruthenium layer 16. Layers 15 and 17 are soft ferromagnetic layers that have been exchange coupled and magnetized to be magnetically antiparallel to one another.

Figure 2:
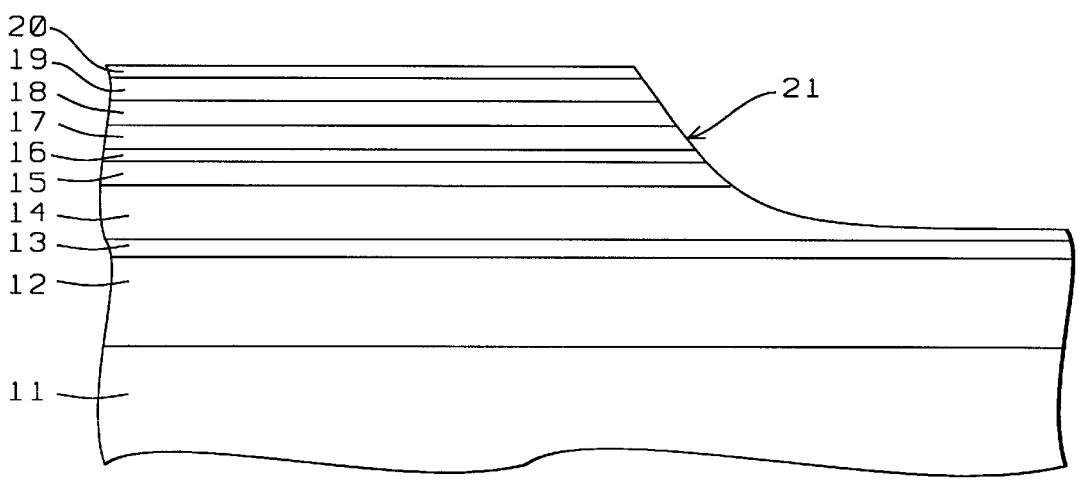
FIG. 2 is FIG. 1 after pedestal formation.

Next, non-magnetic spacer layer 18 (typically copper) is deposited followed by the deposition of free layer 19 and capping layer 20. These layers together constitute a bottom spin valve stack. Next, an etch mask is formed on the capping layer to define a pedestal which is then formed by etching in the presence of this mask (which is not shown). Etching conditions may be chosen so that significant undercutting of the mask occurs or, alternatively, ion beam milling may be used, so that the etch profile can be tailored to some predetermined shape. Either way the net result is a pedestal with sloping sides such as 21 in FIG. 2. Note that only the right hand side of the pedestal is shown in FIG. 2.

The above etch process is controlled so that etching is terminated at a point when less than about 15 Angstroms of layer 14 (the lower of the two anti-parallel layers mentioned earlier) has been removed. As already noted, precise control of the exact depth at which etching terminates is very difficult.

Figure 3:
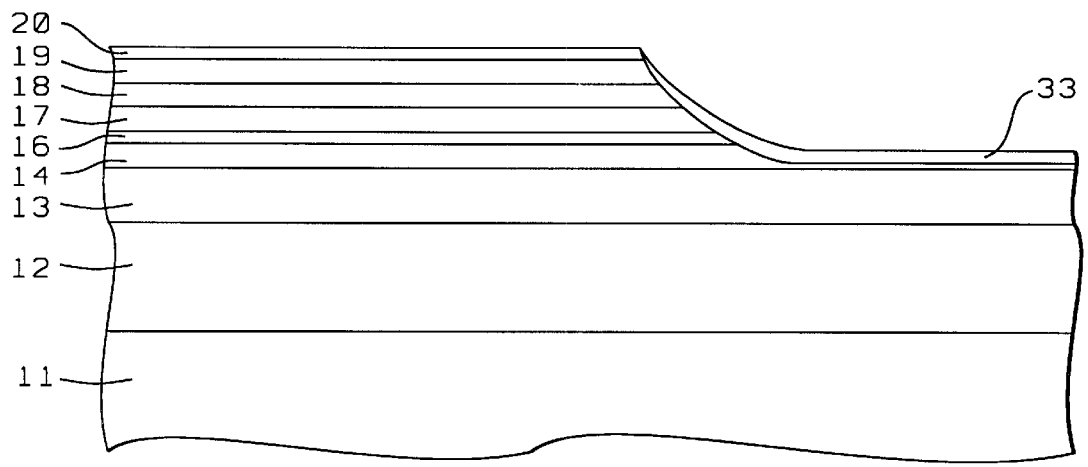
FIG. 3 illustrates the key feature of the invention, namely the deposition of a decoupling layer onto the pedestal sidewalls prior to laying down the soft magnetic layer.

To overcome this end point control problem the present invention introduces here a key novel feature namely the deposition of decoupling layer 33 on the sidewalls of the pedestal (see FIG. 3). The required properties of this layer have already been discussed above.

Figure 4:
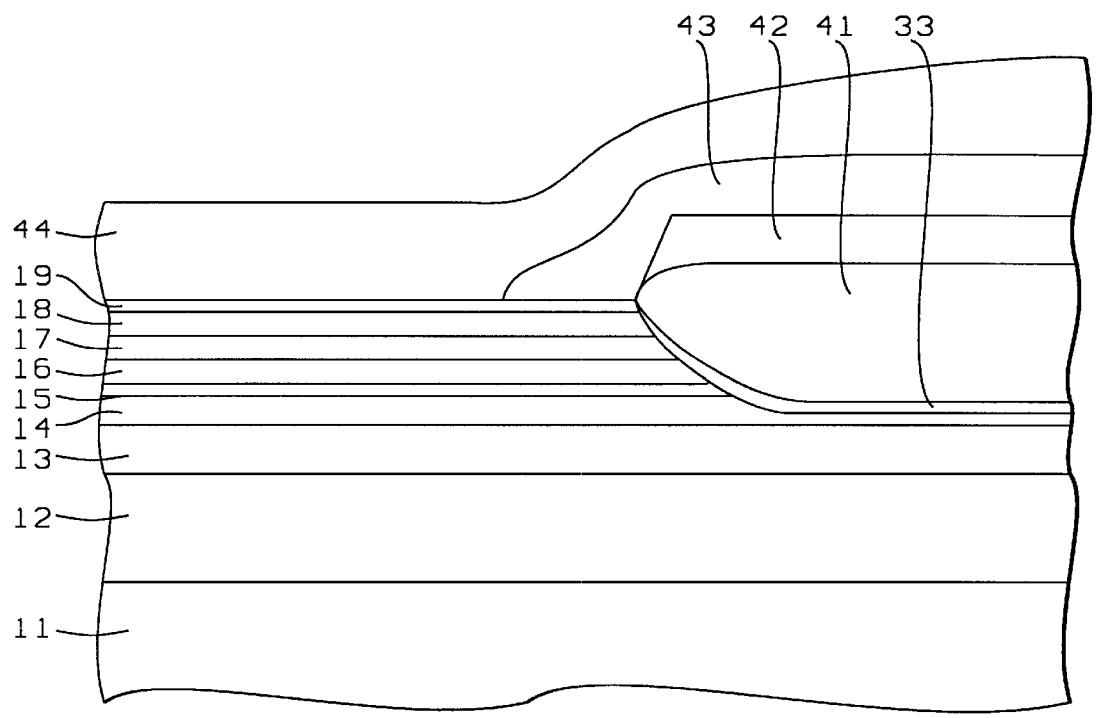
FIG. 4 shows the completed structure.

Referring now to FIG. 4, the final stages of the process the selective deposition (e.g. through use of a lift-off method of patterning) of layer of soft ferromagnetic material 41 onto decoupling layer 33. Layer 41 will be permanently magnetized by laying a second antiferromagnetic layer over it so that it can supply the needed longitudinal bias. Layer 41 is deposited to a thickness between about 70 and 200 Angstroms, with about 80 Angstroms being preferred. Our preferred material for layer 41 has been NiFe but any similar material such as CoFe could have been used.

Next comes the deposition of second antiferromagnetic layer 42 onto layer 41. Our preferred material for layer 42 has been IrMn but a similar material such as NiMn or PtMn could also have been used. The thickness of layer 42 was between about 50 and 200 Angstroms, with about 100 Angstroms being preferred. This was followed by the deposition of conductive lead layer 43 that is patterned so that it overlaps soft ferromagnetic layer 41 and antiferromagnetic layer 42, as well as extending over the inside edge of 43 so as to be able to make direct contact to capping layer 20. The process ends with the deposition onto capping layer 20 and conductive layer 43 of a second dielectric layer 44.

Results

Figure 5:
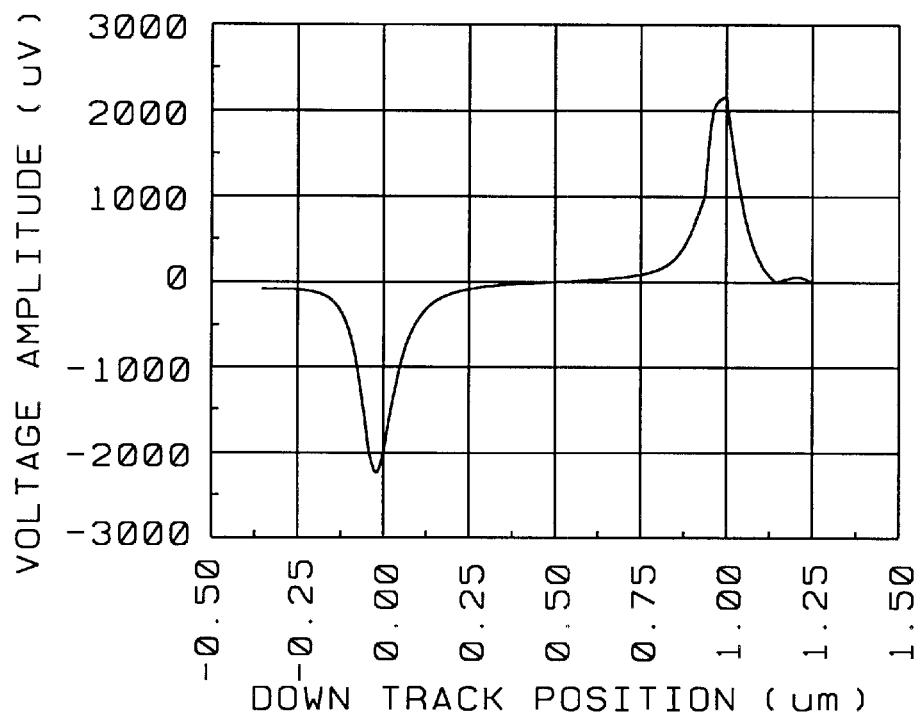
FIGS. 5 and 6 are plots of performance criteria that confirm the effectiveness of the present invention.
Figure 6:
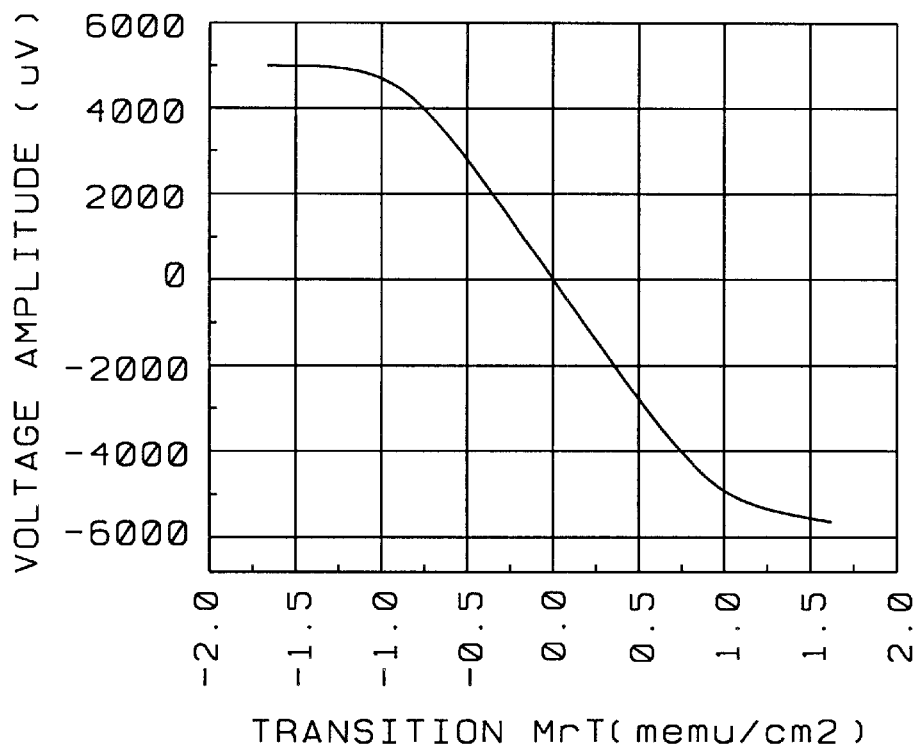

The effectiveness of the invention is confirmed by the data presented in FIGS. 5 and 6. FIG. 5 shows a playback waveform for the head seen in FIG. 4. There is no baseline shift or popping seen, indicating good stability of the head. FIG. 6 is a plot of peak-to-peak voltage amplitude vs medium excitation MrT. The transfer curve is calculated as follows: starting from the most negative MrT, varying MrT step-wise to its most positive value, then back to the most negative MrT again. No hysteresis or loop opening is observed even at MrT values up to 1.5 memu/cm$^2$. This is additional important evidence for the stability of the head. The data were generated by simulation and confirm that uniform results could be obtained over a wide range of samples even though the end point depth after pedestal etching varied by as much as 15 Angstroms.

While the invention has been particularly shown and described with reference to the preferred embodiments thereof, it will be understood by those skilled in the art that various changes in form and details may be made without departing from the spirit and scope of the invention.

What is claimed is:

1. A process for manufacturing a spin valve recording head, comprising:

providing a first dielectric layer on a magnetic shield;

on said first dielectric layer, depositing a GMR enhancing seed layer;

on said seed layer, depositing a first antiferromagnetic layer;

in succession, depositing on said first antiferromagnetic layer a pinned layer, a non-magnetic spacer layer, a free layer, and a capping layer, thereby forming a bottom spin valve stack;

on the capping layer, forming an etch mask that defines a pedestal;

using said mask, etching the stack until all unprotected parts of said capping layer, free layer, and spacer layer and a part of said pinned layer have been removed, thereby forming a pedestal, said pedestal having outwardly sloping sidewalls that extend from the capping layer to the unremoved portion of the pinned layer;

on the sidewalls, depositing a decoupling layer that is between about 20 and 50 Angstroms thick;

on the decoupling layer only, depositing a first layer of soft ferromagnetic material;

on said first layer of soft ferromagnetic material only, depositing a second antiferromagnetic layer;

on the second antiferromagnetic layer, depositing a conductive lead layer that overlaps the first soft ferromagnetic and second antiferromagnetic layers and contacts the capping layer; and on the capping layer and conductive layer, depositing a second dielectric layer.

2. The process described in claim 1 wherein the decoupling layer is selected from the group consisting of tantalum, tantalum oxide, and tantalum nitride.

3. The process described in claim 1 wherein the step of depositing the pinned layer further comprises:

depositing a second soft ferromagnetic layer on said first antiferromagnetic layer, depositing a layer of ruthenium on the second soft ferromagnetic layer, and depositing a third soft ferromagnetic layer on said ruthenium layer.

4. The process described in claim 3 wherein said part of the pinned layer that is removed during said etching step is all of the third soft ferromagnetic layer, all of the ruthenium layer, and less than about 15 Angstroms of the second soft ferromagnetic layer.

5. The process described in claim 1 wherein said first antiferromagnetic layer is selected from the group consisting of MnPt, MnNi, IrMn, and MnPdPt.

6. The process described in claim 1 wherein the first antiferromagnetic layer is deposited to a thickness between about 80 and 200 Angstroms.

7. The process described in claim 1 wherein the first soft ferromagnetic layer is deposited to a thickness between about 50 and 200 Angstroms.

8. The process described in claim 1 wherein said first soft ferromagnetic layer is selected from the group consisting of NiFe and CoFe.

9. The process described in claim 1 wherein said second antiferromagnetic layer is selected from the group consisting of IrMn, PtMn, and NiMn.

10. The process described in claim 1 wherein the second antiferromagnetic layer is deposited to a thickness between about 50 and 200 Angstroms.

11. The process described in claim 1 wherein the first dielectric layer is deposited to a thickness between about 50 and 300 Angstroms.

12. The process described in claim 1 wherein the step of etching the pedestal further comprises use of ion milling whereby said sidewalls may be provided with a predetermined profile.

* * * * *